United States Patent
Claffy

(10) Patent No.: US 7,718,924 B2
(45) Date of Patent: May 18, 2010

(54) MULTIPLE-COMPARTMENT INSULATED FOOD TRAY

(76) Inventor: Joseph Claffy, 5032 Lawn, Western Springs, IL (US) 60558

(*) Notice: Subject to any disclaimer, the term of this patent is extended or adjusted under 35 U.S.C. 154(b) by 497 days.

(21) Appl. No.: 11/423,599

(22) Filed: Jun. 12, 2006

(65) Prior Publication Data

US 2007/0284358 A1 Dec. 13, 2007

(51) Int. Cl.
*F24C 7/10* (2006.01)
*A23C 3/02* (2006.01)

(52) U.S. Cl. .................. 219/386; 99/483; 206/511; 206/545; 206/546; 206/499; 206/515; 220/236; 220/556; 220/23.8; 220/4.25

(58) Field of Classification Search .............. 219/386; 206/511, 545–6, 499, 515; 99/483; 220/236, 220/4.25, 556, 23.8
See application file for complete search history.

(56) References Cited

U.S. PATENT DOCUMENTS

| | | | |
|---|---|---|---|
| 2,837,388 A | 6/1958 | Majeroni et al. | |
| 3,057,510 A | 10/1962 | Blacker | |
| 3,565,245 A | 2/1971 | Asher | |
| 3,608,770 A | 9/1971 | Naimoli | |
| 3,754,640 A | 8/1973 | Bridges | |
| 3,802,593 A | 4/1974 | Bridges | |
| 3,908,852 A | 9/1975 | Ricobene | |
| RE30,962 E | 6/1982 | Bridges | |
| 4,440,303 A * | 4/1984 | Seager | 206/509 |
| D273,928 S | 5/1984 | Tarozzi | |
| 5,016,756 A | 5/1991 | Wischhusen | |
| 5,116,240 A * | 5/1992 | Wischhusen et al. | 206/545 |
| D439,113 S | 3/2001 | Claffy et al. | |
| D439,474 S | 3/2001 | Claffy et al. | |
| D440,117 S | 4/2001 | Claffy | |
| D440,118 S | 4/2001 | Claffy | |
| 2006/0068206 A1 | 3/2006 | Hala et al. | |

FOREIGN PATENT DOCUMENTS

| | | |
|---|---|---|
| GB | 2088700 A | 6/1982 |
| GB | 2121766 A | 1/1984 |
| GB | 2265706 A | 6/1993 |

* cited by examiner

*Primary Examiner*—Shawntina Fuqua
(74) *Attorney, Agent, or Firm*—Vedder Price PC

(57) ABSTRACT

The present disclosure provides a multiple-compartment insulated food tray and lid for storage and service. The insulated food trays allow for two or more stacked strays to be mechanically unified using the weight of the top tray on the bottom tray in any orientation where the weight of the second tray remains on the first tray. In another embodiment of the present disclosure, a polymer with foam and blowing agents are used during the molding process to create in a first phase a hard shell in contact with the mold. In a second phase, insulation is created in the hard shell by thermal treatment and expansion of the residual polymer inserted in the mold. In a third embodiment of the present disclosure, the insulated food trays, when stacked, can be placed in a nondiscriminatory arrangement.

24 Claims, 5 Drawing Sheets

MULTIPLE-COMPARTMENT INSULATED FOOD TRAY

FIELD OF THE DISCLOSURE

The present disclosure relates to a multiple-compartment insulated food tray for storage and service, and more particularly an insulated food tray and method of manufacture using a durable polymer matrix wherein each main compartment is insulated.

BACKGROUND

Meals served to humans generally include multiple courses served at different temperatures. Normally, each courses is served on a different plate, often at different temperatures, and at different time intervals. In some circumstances, large groups of people must be fed where special requirements are imposed. In some environments, such as school cafeterias, incarceration facilities, hospitals, military bases, summer camps, airplanes, nursing homes, etc., food service must be provided to large groups without generating excessive dirty dishes or utensils, and those dishes and utensils must limit manipulation problems at service, provide ease in storage, be easily cleaned, protect the user from sharp objects, and even respect strict logistical restraints.

The use of food serving systems based on trays is known in the art. The first generation of trays was made of disposable structures with removable inserts. More robust trays include a light-weight frame with vertical separators designed to segregate the courses, but these trays offered little or no thermal insulation between the courses. A common example of these trays include the familiar TV dinner tray, which is able to hold frozen food for long periods of time and later be placed in a conventional oven. Trays may include compartments to separate cold foods from hot foods, wet courses from dry courses, and prevent mixing of the courses. Trays may also include compartments in which small items such as condiments can be served.

Thin-walled metallic trays are light and disposable but offer little temperature control of the food. If heated courses are placed in these trays, the trays themselves can become hot, the hands of users can be burned, and food courses can reach thermal equilibrium within minutes. Newer versions of trays include insulation placed within a shell made by the tray, but these shells are often bulky, require numerous and expensive manufacturing steps, result in very small compartment sizes, and are still vulnerable to thermal equilibrium unless they are covered by a second tray or a lid. For this reason, a thin-walled robust food tray capable of insulating the food is needed.

Another problem with existing trays is the incapacity to provide for an efficient and safe way to supply of utensils without resulting to a dedicated compartment in the tray, or an independent and external supply of utensils. Placing utensils within a compartment often results in the utensil being in contact with the food. What is needed is a food tray able to provide for utensil delivery system without negatively affecting the other functions of the food tray, such as the capacity.

Yet another problem of existing food tray technology is partial insulation resulting from stacking trays. Food place within a recessed portion of a first insulated food tray is insulated from the environment, but if the courses include hot and cold portions located in different compartments, both courses reach an intermediate thermal equilibrium quickly within the food tray. What is needed is a compartment-specific insulated food tray. The use of compartment-specific insulation may also offer odor control in order to better preserve the aroma of each course.

SUMMARY

It is an object of the present disclosure to provide an insulated, multiple-compartment food tray and lid for storage and service. The insulated food tray and lid is equipped with a circumferential, weight-activated lip and a series of female U-shaped lips located on the tops of the internal and external walls of the insulated food tray. If a lid or a second insulated food tray acting as a lid is placed on top of the first insulated food tray, an L-shaped circumferential lip and male U-shaped lip located on the bottom portion of the second tray seals the compartments from each other resulting in thermal and aromatic segregation among the compartments. The use of a long, L-shaped lip on the circumference of the insulated food trays allows for two stacked strays to be mechanically unified using the weight of the top tray on the bottom tray in any orientation where the weight of the second tray remains on the first tray.

In another embodiment of the present disclosure, a polymer with foam and blowing agents is used during the molding process to create in a first phase a hard shell in contact with the mold. In a second phase, insulation is created in the hard shell by thermal treatment and expansion of the residual polymer inserted in the mold. This two-step formation process allows for a light, robust insulated food tray with better capacity and improved properties over existing food tray technologies. In a third embodiment of the present disclosure, the insulated food trays can be stacked in a nondiscriminatory arrangement by rotating one tray in relationship with the next by a fixed angle depending on the geometry of the insulated trays.

DETAILED DESCRIPTION

Figure 1:
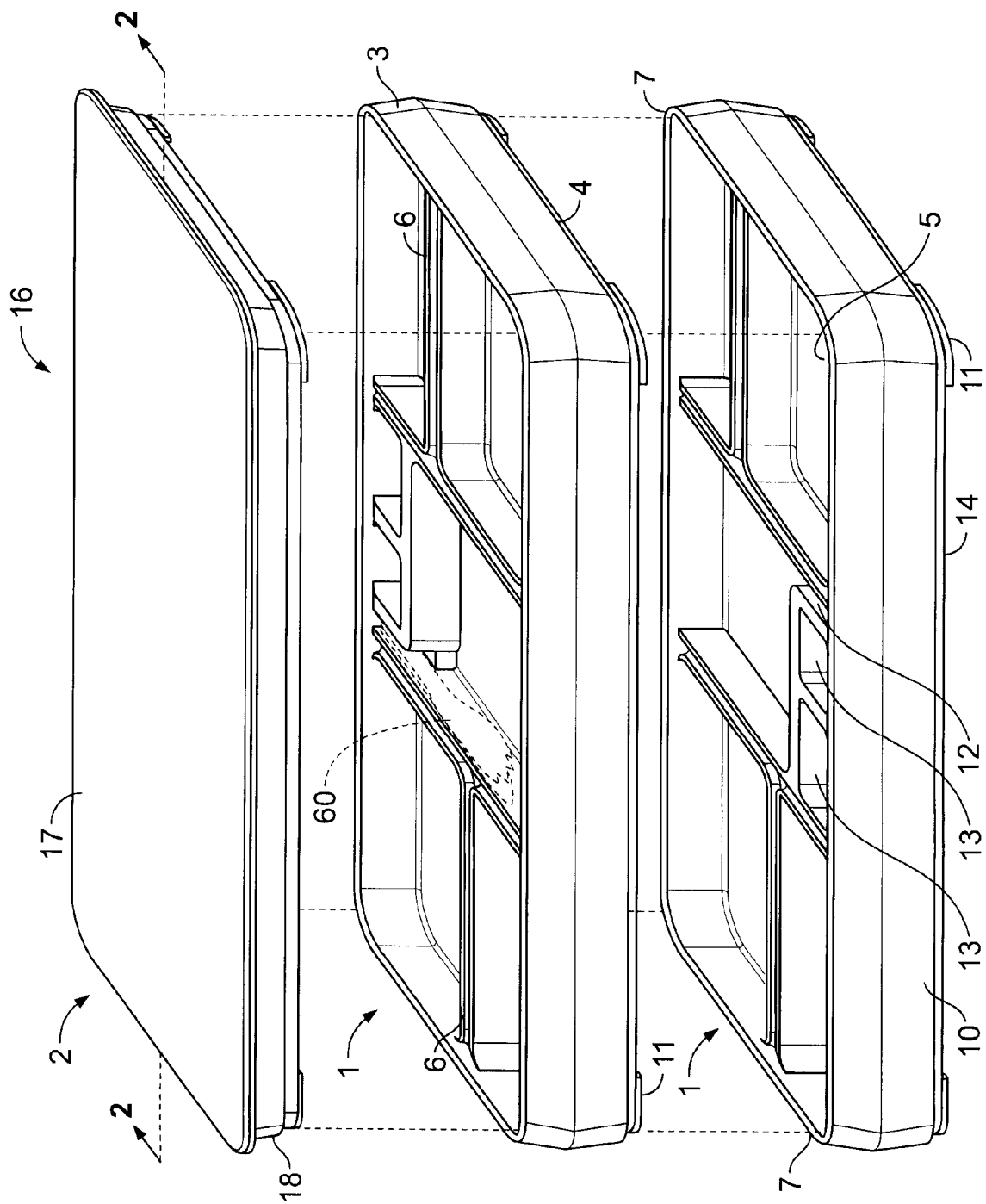
FIG. 1 is an exploded view of a stack of two insulated food trays and a top lid in accordance with an embodiment of this disclosure.

Referring to FIG. 1, a stack 16 of insulated food trays 1 and lid 2 is shown. In this possible embodiment, two insulated food trays 1 are shown stacked vertically, and a lid 2 is placed on top of the upper insulated food tray 1. It is understood by one of ordinary skill in the art that while only two insulated food trays 1 are illustrated, a stack can include a greater plurality of insulated food trays 1.

The bottom insulated food tray 1 as shown on FIG. 1 is arranged nondiscriminatorily in relation to the top insulated food tray 1 and can be rotated in the horizontal plane by 180 degrees. While a single nondiscriminatorily arranged configuration is illustrated in FIG. 1, it is understood by one of ordinary skill in the art that many different configurations and nondiscriminatory arrangements are possible based on a plurality of factors, including the geometry of the insulated food tray 1 and the arrangement of the different inner compartments. An illustrative but nonlimiting example includes an octagonal insulated food tray with eight compartments located circumferentially around a single center compartment. In this example, a top insulated food tray 1 could be placed nondiscriminatorily in eight orientations in relation to a bottom insulated food tray 1 by rotating the top or bottom tray by any factor of 45 degrees.

Figure 2:
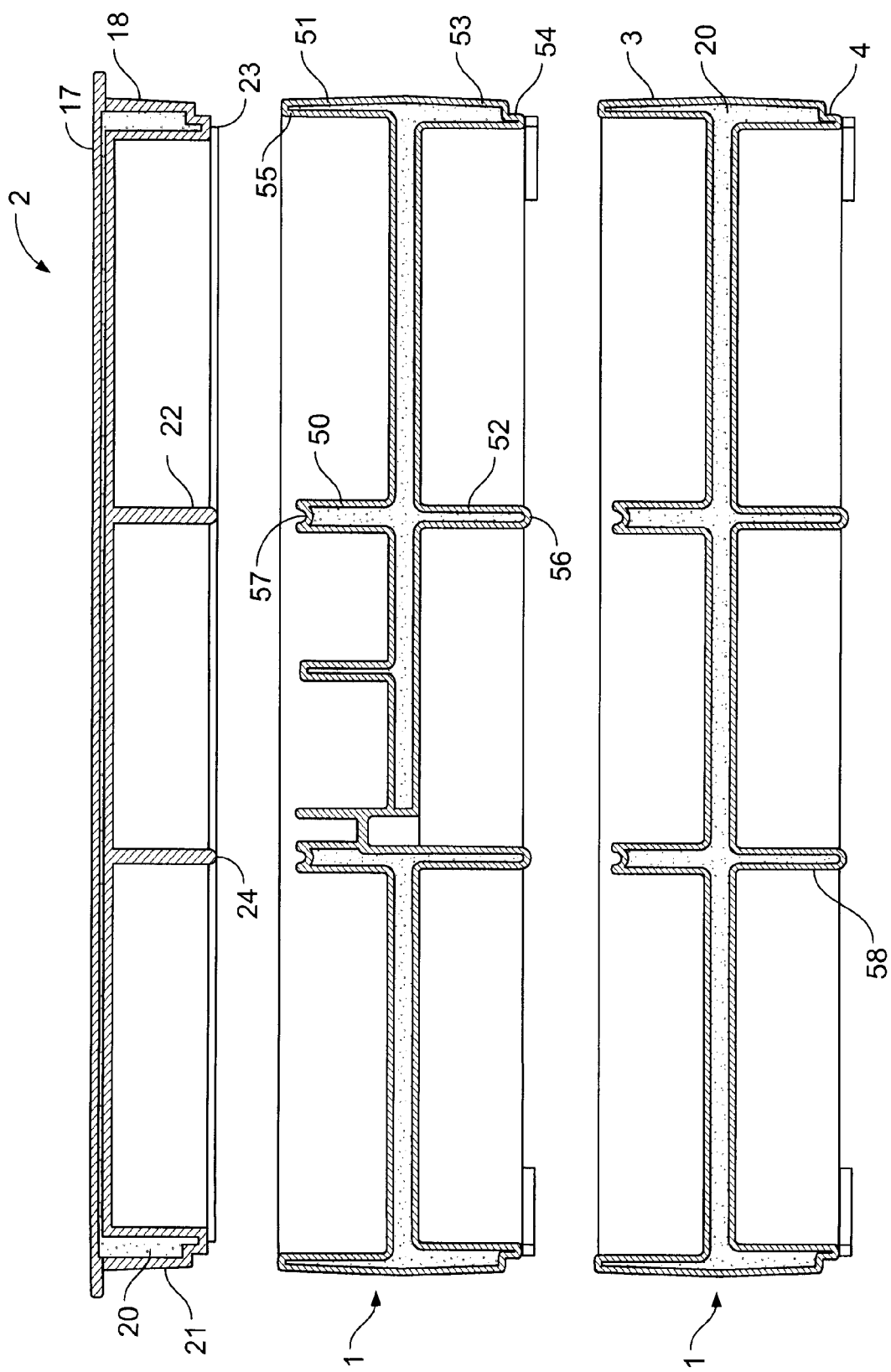
FIG. 2 is a side view along cut-line 2-2 of the exploded view of the stack of two insulated food trays and the top lid of FIG. 1.

FIG. 2 shows an insulated food tray 1 of FIG. 1 comprising an upper surface member 3 of a first height 51 and a lower surface member 4 of a second height 53 connected to the upper surface member 3 to form an outer shell 21 with an inner volume 20. An insulated material is released in the inner volume 20 in a phase of the formation process of the insulated food tray 1.

Figure 7:
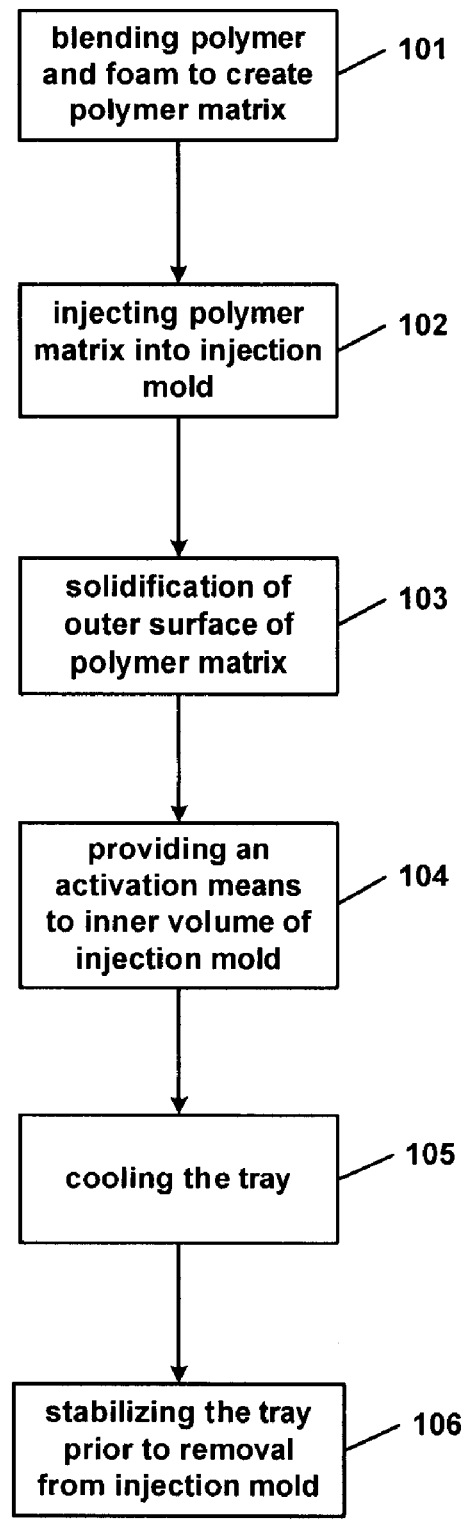
FIG. 7 is a functional diagram in accordance with a method of manufacturing an insulated food tray in accordance with an embodiment of this disclosure.

The inner volume 20 is filled with an insulating medium as a result of the formation process of the outer shell 21. An injection molding method for manufacturing an insulated food tray is shown in FIG. 7. In a first step 101, a series of agents are blended into a polymer in order to create a durable polymer matrix. A quantity of blowing agent is added to the mix. In a preferred embodiment, a range of 1% to 5% of weight is added. It is understood by one of ordinary skill in the art that while a preferred range is disclosed, the determination of the quantity and proportion of blowing agent to be added to a mix is a function of the chemical nature of the blowing agent and the chemical stability of the base polymer as processed during molding by the injection mold and associated molding apparatus. A quantity of structural foam is also added to the polymer mix. In a preferred embodiment, the range is 5% to 20%. It is also understood by one of ordinary skill in the art that as for any other agent added to the polymer mix, the determination of the quantity and proportion of structural foam needed are a function of the chemical nature of the foaming agent and the chemical stability of the base polymer in combination with any other agent as used during the process of molding by injection. In a second step 102, the durable polymer matrix is injected into the mold using conventional injection molding techniques. It is understood by one of ordinary skill in the art that the precise amount of durable polymer to be injected is a function of the actual geometry of the insulated food tray and the expansion volume of the insulation 20 within the inner shell 21 and must be calibrated upon injection based on the parameters of the injection molding device.

In a third step 103 also shown in FIG. 7, the polymer matrix is solidified on the outer surface of the insulated food tray in order to form an outer shell 21 in contact with the cold, inside surface of the injection mold. It is understood by one of ordinary skill in the art of injection molding that the thickness of the shell and the injection locations in the mold needed to form the plurality of ribs and structures of the insulated food tray 1 are calibrated using classical injection molding techniques. In a fourth step 104, a fraction of the polymer matrix remaining inside the shell is heated to allow the endothermic or exothermic durable polymer matrix to generate gas to form a solid insulation material with small gas bubbles. In a preferred embodiment, nitrogen gas is released during an endothermic reaction, but it is understood by one of ordinary skill in the art that any type of release gas chemically activated during the heating phase may be used, as well as any other neutral gas or expansion solid. It is understood that activation of the foam agent and the blowing agent by heat or other activation source is a very broad technology. What is contemplated is any activation means including but not limited to heat, cold, friction, time, chemical by-products, electrical current, magnetic excitation, irradiation, vibration, and any other potential energy source able to activate an agent found within a polymer matrix and create an insulation phase. In a preferred embodiment, the heating phase is conducted during approximately six minutes and at a temperature of approximately 140 degrees F. It is understood by one of ordinary skill in the art of heating injection molded pieces that the temperature and duration of the heating phase are a function of a plurality of parameters needed to activate agents within the polymer matrix and correspond to the current best mode.

The next step of the method of manufacturing relates to cooling the insulated food tray within the injection mold 105. In a preferred embodiment, water is used to cool the mold to facilitate stabilization of the agents and the insulation 20 within the outer shell 21. It is understood by one of ordinary skill in the art that the insulated food tray 1 within the injection mold can be cooled using a plurality of conventional means including but not limited to air cooling, mold cooling, time cooling, and compressed gas cooling. In a next step, the insulated tray 1 is stabilized 106 before removal from the injection mold using classical techniques including but not limited to hand removal or mechanical removal.

Returning to the embodiment shown as FIGS. 1 and 2, the upper surface 3 of a first height 51 and the lower surface 4 of a second height 53 are shown to be the same height corresponding to roughly half of the total height of the insulated food tray 1. It is understood by one of ordinary skill in the art that while first and second heights 51, 53 are shown in this proportion in a preferred embodiment, the respective heights can correspond to any proportion of the total height of the insulated food tray 1 as long as the functional limitations associated with stacking the insulated food trays 1 is made possible.

The upper surface member 3 is relieved to define a plurality of inner compartments 5 of at least a third height 50 of a first top lip 57 and an outer rim 7 [not shown] with a second top lip 55 of the first height 51. The lower surface member 4 is relieved to define inner ribs 58 of a fourth height 52 with a first bottom lip 56 and a second outer rim 14 [not shown] with a second bottom lip 54 of the second height 53. While the surface member 3 is described with the help of elements of two heights called a first height 51 and a third height 50, respectively, it is understood by one of ordinary skill in the art that both heights may be of the same height or that any of the two heights may be higher from the bottom surface of the compartments 5 without any influence on this disclosure. The same may be said for the second height 53 and the fourth height 52 on the bottom member 4. The use of the terms "second" and "fourth" are not indicative of the necessity of a difference in height or any indication that the second height 53 is more important than the fourth height 52.

Figure 3:
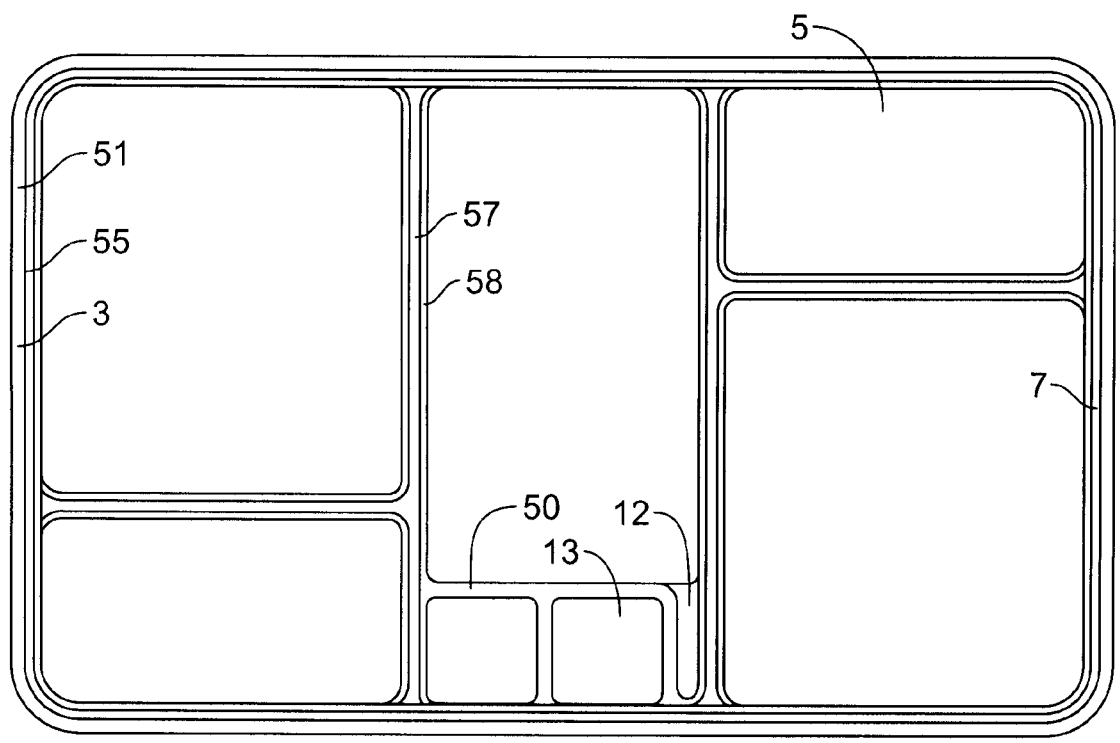
FIG. 3 is a top view of an insulated food tray in accordance with an embodiment of this disclosure.
Figure 5:
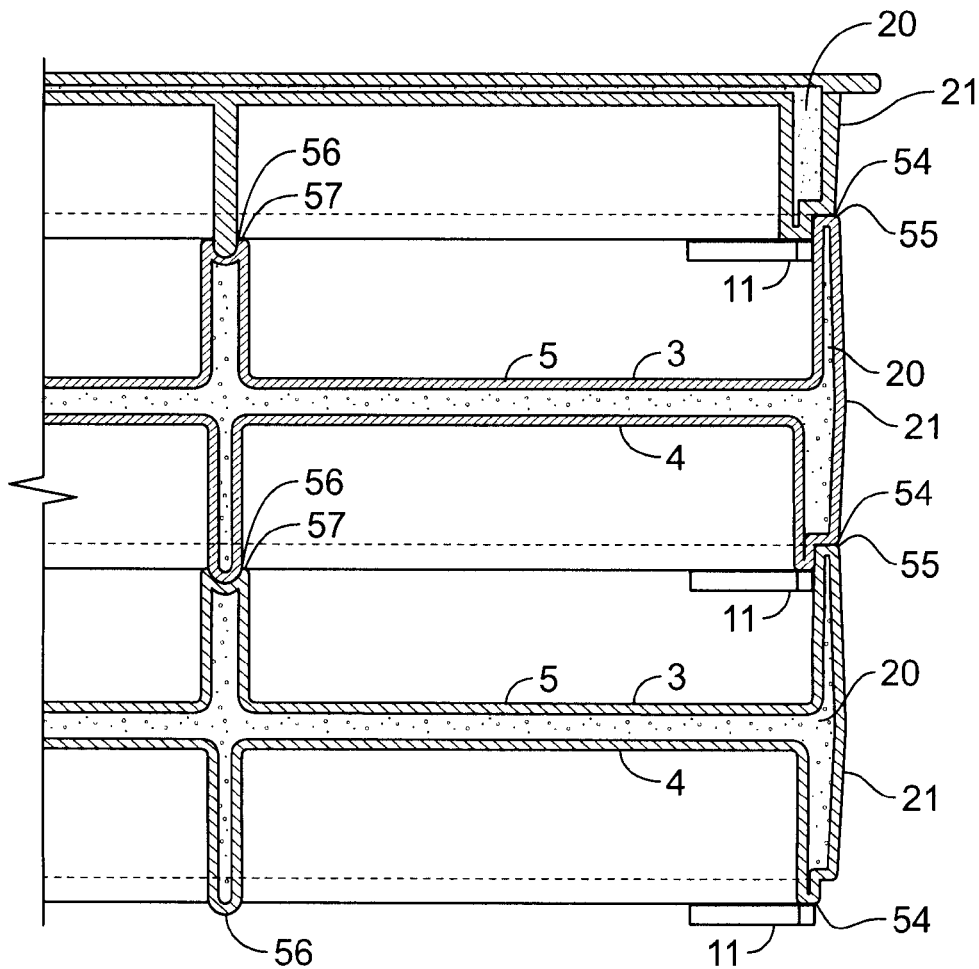
FIG. 5 is a detail cut view of the L-shaped lip of an assembled stack of insulated food trays and a top lid in accordance with an embodiment of the present disclosure.
Figure 6:
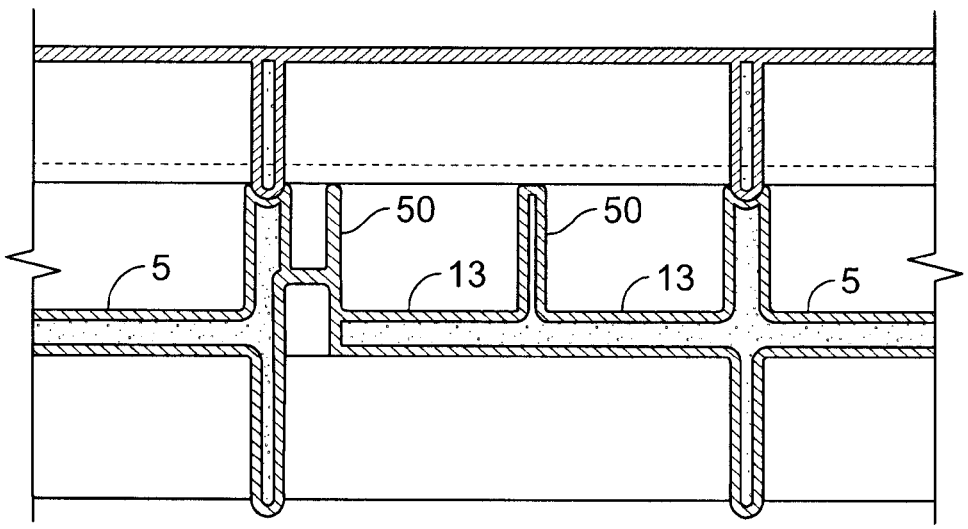
FIG. 6 is a detail cut view of the U-shaped lip in the assembled stack of insulated food trays and top lid in accordance with the embodiment of FIG. 5.

The contents of an inner compartment 5 in a first insulated food tray 1, as shown in FIG. 3, is insulated by another inner compartment 5 in the first insulated food tray 1 by placing a second insulated food tray 1 on the top of the first insulated food tray 1 so the first bottom lip 56 and the second bottom lip 54 of the second insulated food tray 1 connects with the first top lip 57 and the second top lip 55 of the first insulated food tray 1, respectively. FIGS. 5 and 6 show two detail of the embodiment of FIGS. 1 and 2 where both bottom lips 56, 54 of the second insulated food tray 1 connect with both top lips 57, 55 of the first insulated food tray 1. It is understood that while the present disclosure relates to an embodiment where the combined height of the first and second heights 51, 53 must be approximately the same as the combined height of the third and fourth heights 50, 52 in order to seal the compartments 5, other heights may be contemplated that are sufficient to seal the compartments 5. It is be understood by one of ordinary skill in the art that while the best mode of a preferred embodiment disclosed is made of a single molded element, the art of injection molding allows contemplation of the use of the merger of more than a single molded element in order to create the preferred embodiment. A nonlimiting example includes the use of a first upper surface member 3 of a first height 51 wherein a series of smaller containers would be connected to the inside portion of the relieved portion of the upper surface member in order to recreate containers 5. The present disclosure contemplates the use of any combination of elements in order to create the essential properties of the insulated food tray disclosed herein.

In another embodiment, the seal between the first top lip 57 is made of a female U-shaped lip, and the first bottom lip 56 is made of a male U-shaped lip in order to allow for the compartment 5 to be sealed when the upper surface member 3 of a first insulating food tray 1 is placed under the lower surface member 4 of a second insulated food tray 1. In another preferred embodiment, the second top lip 55 is made of a male U-shaped and the second bottom lip 54 is a recessed L-shaped lip. In the preferred embodiment shown as FIGS. 1-6, the L-shaped lip is inverted and the top portion of the L-shaped lip is located inside of the volume formed by the second top lip 55 of the first insulated food tray 1. It is understood by one of ordinary skill in the art that while U-shaped and L-shaped lips are disclosed and shown, these shapes may be made of a series of flat or curved sections assembled to recreate these shapes. It is understood that the maximum angular radius of any connecting angle is determined by the manufacturing process and molding tolerances associated with the molding process. In a preferred embodiment, the lips 56, 54 are approximately ⅛th inch in lateral thickness and the U-shaped lip and L-shaped lip have a quasicircular head radius and a very thick wall.

Figure 4:
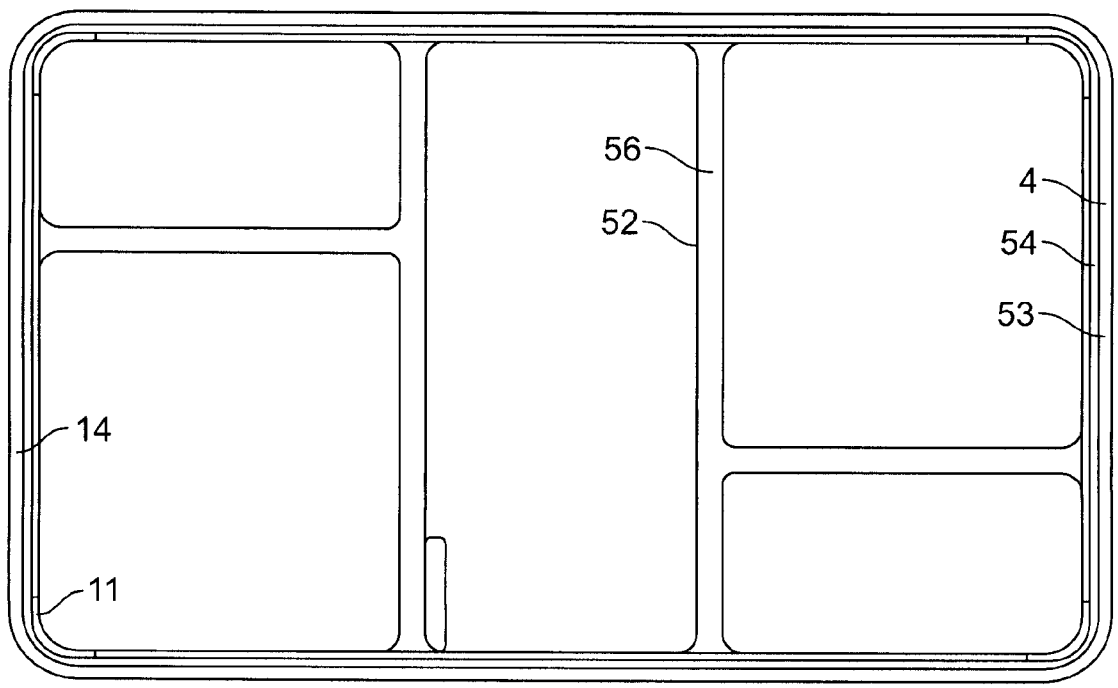
FIG. 4 is a bottom view of the insulated food tray of FIG. 4.

As shown on FIG. 4, support corner tabs 11 are placed on the bottom section of the L-shaped lip 54. These tabs serve a plurality of functions including but not limited to improving locally the coverage section between both insulated food trays in a stack 16, and protecting the first bottom lip 56 from friction and wear when the insulated food tray 1 is placed on a table or other surface. In a preferred embodiment, the support corner tabs are about 1/16th inch in height. It is understood by one of ordinary skill in the art that a plurality of support mechanisms can be used to protect the first bottom lip 56 from wear.

One of the compartments 5 includes a notch holder 12 able to receive a utensil 60 as shown using phantom lines in FIG. 1. The notch holder is designed to hold a utensil 60 specifically designed to be used in conjunction with food courses served within one or more of the compartments 5. In a preferred embodiment, the handle of the utensil is inserted in the notch 12 in order to protect the apprehension section of the utensil 60 from coming in substantial contact with food placed in the compartment 5 where the utensil 60 is situated.

In yet another embodiment as shown in FIGS. 1-2, the upper surface 3 of the insulated food tray 1 is further relieved to create two side-by-side volume separators 13. In a preferred embodiment, the volume separators 13 define condiment holders to be used in association with one of the courses placed in the containers 5. It is understood by one of ordinary skill in the art what while two volumes are shown, different quantities or types of volumes may be contemplated. In addition, in the preferred embodiment shown, the third height 50 of the condiment sections 13 does not include a first top lip 57 to be associated with a first bottom lip 56 of an associated fourth height 52 of a second insulated food tray 1. This configuration contemplates use where the condiment compartments 13 are not completely insulated from the surrounding immediate compartment 5. It is understood by one of ordinary skill that any combination of sealed or unsealed first bottom lip 56 may be used in association with this disclosure depending on the desired level of insulation to be obtained.

FIG. 1-2 illustrates a situation where a first insulated food tray 1 is insulated by placing a second insulated food tray 1 on top. The figures also show the situation where the second insulated food tray 1 is insulated by placing a lid 2 on top. The lid comprises a second upper surface member 17 and a second lower surface member 18. The lower surface member 18 is relieved to create a series of ribs 22 to mimic the lower surface 4 of the insulated food tray 1. In the preferred embodiment, the second upper surface member 17 is flat, but it is understood by one of ordinary skill in the art that the lid may be made of a wide variety of geometries and include numerous functional features to serve any additional purpose.

FIGS. 1-2 show an exploded view of the tray stack shown in FIGS. 5-6. When trays and/or a lid are stacked, the weight of the top trays, along with the weight of the food courses placed in the compartments 5, serve to seal the bottom insulated food tray 1 with the top insulated food tray 1 or lid 2. It is understood that if an insulated food tray is insulated and sealed by gravitational force, the seal may be broken if the stack 16 is rotated to a significantly vertical configuration. The disclosure provides for a stack of trays able to remain sealed as long as the weight of the top insulated food tray 1 or lid 2 pushes on the bottom insulated food trays 1.

FIG. 3 is a top view of an insulated food tray in accordance with an embodiment of this disclosure. FIG. 4 is a bottom view of the insulated food tray of FIG. 4. FIG. 5 is a detail cut view of the L-shaped lip of an assembled stack and top lid of insulated food trays in accordance with an embodiment of the present disclosure. FIG. 6 is a detail cut view of the U-shaped lip in the assembled stack and top lid of insulated food trays in accordance with the embodiment of FIG. 5.

Persons of ordinary skill in the art appreciate that although the teachings of the disclosure have been illustrated in connection with certain embodiments, there is no intent to limit the invention to such embodiments. On the contrary, the intention of this disclosure is to cover all modifications and embodiments falling fairly within the scope of the teachings of the disclosure.

What is claimed is:

1. A one-piece insulated food tray, comprising:
    an upper surface; and
    a lower surface circumferentially connected to the upper surface both formed from a durable polymer matrix during a formation process to form an outer shell with an inner volume;
    said durable polymer matrix during said formation process filling said inner volume so as to form a solid insulating material in said inner volume and with said outer shell, a one piece tray; and
    wherein the upper surface is of a first height; a lower surface is of a second height, the upper surface is relieved to define a plurality of inner compartments of at least a third height with a first top lip, and an outer rim with a second top lip at the first height, and the lower surface is relieved to define inner ribs of a fourth height with a bottom lip, and a second outer rim with a second bottom lip at the second height.

2. The insulated food tray of claim 1, wherein the formation process is injection molding.

3. The insulated food tray of claim 2, wherein the insulated medium is an insulating foam made by an endothermic or an exothermic reaction to the formation process of the outer shell by adding a blowing agent and a foaming agent to an injection polymer used in the injection molding of the outer shell.

4. The insulated food tray of claim 3, wherein from 1% to 5% of blowing agent is added to the injection polymer.

5. The insulated food tray of claim 3 wherein from 5% to 20% of foaming agent is added to the injection polymer.

6. A one-piece insulated food tray, comprising:
an upper surface of a first height;
a lower surface of a second height connected to the upper surface to form an outer shell with an inner volume; and
an insulated material formed in the inner volume;
wherein the upper surface is relieved to define a plurality of inner compartments of at least a third height with a first top lip, and an outer rim with a second top lip at the first height, and the lower surface is relieved to define inner ribs of a fourth height with a first bottom lip, and a second outer rim with a second bottom lip at the second height;
the first top lip is a female U-shaped lip and the first bottom lip is a male U-shaped lip, both lips able to seal the upper surface of a first insulating food tray with the lower surface of a second insulating food tray;
the second top lip is a male U-shape and the second bottom lip is a recessed L-shaped lip; and
wherein the content of an inner compartment in a first insulated food tray is insulated of another inner compartment in the first insulated food tray by placing a second insulated food tray so the first bottom lip and the second bottom lip of the second insulated food tray connects with the first top lip and the second top lip of the first insulated food tray.

7. The insulated food tray of claim 6, wherein the bottom L-shaped lip includes a series of support corner tabs.

8. The insulated food tray of claim 6, wherein the upper surface is further relieved at a location to create a notch holder.

9. The insulated food tray of claim 8, wherein the notch holder allows for the insertion and hold of part of the handle of a utensil.

10. The insulated food tray of claim 6, wherein the upper surface is further relieved to create two side-by-side volume separators within one of the inner compartments.

11. The insulated food tray of claim 6, wherein the volume separators are condiment holders.

12. An insulated food tray, comprising:
an upper surface;
a lower surface connected to the upper surface to form an outer shell with an inner volume; and
an insulated material formed in the inner volume during the formation process of the outer shell;
wherein the upper surface is relieved to define a first outer rim with a male U-shape top lip and an inner support section, and the lower surface is relieved to define a second outer rim with a L-shaped bottom lip and an outer support section;
the inner support section of a first insulated food tray interlocks with the outer support of a second insulated tray and the male U-shape top lip of the first insulated food tray interlocks with the L-shaped bottom lip of the second insulated food tray and where both insulated food trays are interlocked using a weight of the second insulated food tray; and
wherein the upper surface is relieved to define a plurality of inner compartments having a first top lip and the lower surface is relieved to define inner ribs with a first bottom lip so that the bottom lip of a second food tray connects with the first top lip of a first food tray.

13. The insulated food tray of claim 12, wherein the weight of the second insulated food tray is sufficient to interlock the insulated food trays between a horizontal configuration to a significantly vertical configuration.

14. A stack of insulated food trays, comprising:
top and a bottom insulated food trays, each tray comprising an upper surface of a first height; a lower surface of a second height connected to the upper surface member to form an outer shell with an inner volume; and an insulated material formed in the inner volume during the formation process; wherein the upper surface is relieved to define a plurality of inner compartments of at least a third height with a first top lip, and an outer rim with a second top lip at the first height, and the lower surface is relieved to define inner ribs of a fourth height with a first bottom lip, and a second outer rim with a second bottom lip at the second height; and wherein the content of an inner compartment in the bottom insulated food tray is insulated of another inner compartment in the bottom insulated food tray by placing the top insulated food tray so the first bottom lip and the second bottom lip of the top insulated food tray connects with the first top lip and the second top lip of the bottom insulated food tray.

15. The stack of insulated food trays of claim 14, wherein the trays can be stacked in a nondiscriminatory arrangement where the first bottom lip and the second bottom lip of the top insulated food tray remains in contact with the first top lip and the second top lip of the bottom insulated food tray even after rotation of the top insulated food tray is made compared to the bottom insulated food tray.

16. The stack of insulated food trays of claim 15, wherein the rotation is of 90 degrees, 180 degrees, or 270 degrees clockwise.

17. An insulated food tray and lid, comprising:
an insulated food tray comprising an upper surface of a first height; a lower surface of a second height connected to the upper surface to form an outer shell with an inner volume; and an insulated material formed in the inner volume; wherein the upper surface member is relieved to define a plurality of inner compartments of at least a third height with a first top lip, and an outer rim with a second top lip at the first height, and the lower surface is relieved to define inner ribs of a fourth height with a first bottom lip, and a second outer rim with a second bottom lip at the second height;
the first top lip is a female U-shaped lip and the first bottom lip is a male U-shaped lip, both lips able to seal the upper surface member of a first insulating food tray with the lower surface of a second insulating food tray; and
a lid comprising a second upper surface, and a second lower surface relieved to mimic the lower surface of the insulated food tray, including a first bottom lip and a second bottom lip;
wherein the content of an inner compartment in the bottom insulated food tray is insulated of another inner compartment in the bottom insulated food tray by placing the insulated food tray so the first bottom lip and the second bottom lip of the lid connects with the first top lip and the second top lip of the insulated food tray.

18. The insulated food tray and lid of claim 17, wherein the upper surface of the lid is flat.

19. An injection molding method for manufacturing an insulated food tray from thermoplastically processible plastic molding materials with an outer shell and an inner volume filled with an insulation material, whereby a plastic molding material comprises a durable polymer matrix, a blowing agent and a structural foam, and whereby the injection molding method comprises the steps of:

blending into a polymer a first quantity of blowing agent and a second quantity of structural foam in order to form the plastic molding material into a durable polymer matrix;

injecting the durable polymer matrix into an injection mold;

solidification of the polymer matrix on the outer surface to form an outer shell in contact with the cold inside part of the mold;

providing an activation means to an unsolidified inner durable polymer matrix to generate gas and form a solid insulation material with gas bubbles;

cooling of the insulated food tray; and stabilizing of the insulated food tray before mechanical removal from the injection mold.

20. The injection molding method of claim 19, wherein the activation means is heat for a fixed period of time at a fixed temperature to allow the endothermic or exothermic reactions.

21. The injection molding method of claim 19, wherein the blowing agent within the durable polymer matrix ranges from 1% to 5% in weight.

22. The injection molding method of claim 19, wherein the structural foam within the durable polymer matrix ranges from 5% to 20% in weight.

23. The injection molding method of claim 20 wherein the fixed period of time is approximately 6 minutes.

24. The injection molding method of claim 20 wherein the fixed temperature is approximately 140 degrees F.

\* \* \* \* \*